(12) United States Patent  (10) Patent No.: US 7,883,067 B2
Walters et al.  (45) Date of Patent: Feb. 8, 2011

(54) CEILING MOUNTING SYSTEM

(75) Inventors: James Duane Walters, Saint Charles, IL (US); Matthew William Stifal, Portage, IN (US)

(73) Assignee: Peerless Industries, Inc., Aurora, IL (US)

( * ) Notice: Subject to any disclaimer, the term of this patent is extended or adjusted under 35 U.S.C. 154(b) by 219 days.

(21) Appl. No.: 11/981,899

(22) Filed: Nov. 1, 2007

(65) Prior Publication Data

US 2008/0128574 A1 Jun. 5, 2008

Related U.S. Application Data

(63) Continuation-in-part of application No. 29/263,667, filed on Jul. 27, 2006, now Pat. No. Des. 563,700.

(60) Provisional application No. 60/856,140, filed on Nov. 2, 2006.

(51) Int. Cl.
*A47H 1/10* (2006.01)
(52) U.S. Cl. .................. 248/317; 248/340; 248/343
(58) Field of Classification Search ............. 248/227.4, 248/317, 214, 324, 340, 341, 343, 344, 550, 248/589, 900
See application file for complete search history.

(56) References Cited

U.S. PATENT DOCUMENTS

| | | | | |
|---|---|---|---|---|
| 393,126 A * | 11/1888 | Smart | ...................... | 285/153.1 |
| 394,680 A * | 12/1888 | Dawes | ...................... | 248/326 |
| 684,264 A * | 10/1901 | Kemmerer | ...................... | 248/343 |
| 866,473 A * | 9/1907 | Keefe et al. | ...................... | 248/326 |
| 1,501,524 A * | 7/1924 | Cousins | ...................... | 362/311.09 |
| 2,762,598 A * | 9/1956 | Runge | ...................... | 248/327 |
| 2,967,040 A * | 1/1961 | Picha | ...................... | 248/324 |
| 3,512,743 A * | 5/1970 | Lipscomb | ...................... | 248/324 |
| 3,856,251 A * | 12/1974 | Miller | ...................... | 248/205.1 |
| 4,041,657 A * | 8/1977 | Schuplin | ...................... | 52/39 |
| 4,122,762 A * | 10/1978 | Williams | ...................... | 454/292 |
| D270,689 S | 9/1983 | Boscacci | | |
| 4,964,606 A * | 10/1990 | Beam et al. | ...................... | 248/333 |
| D314,483 S | 2/1991 | Zimprich et al. | | |
| 5,127,617 A | 7/1992 | Bergetz | | |
| 5,148,282 A | 9/1992 | Sedighzadeh | | |
| D337,103 S | 7/1993 | Harper | | |
| D337,897 S | 8/1993 | Hundertmark | | |
| 5,400,993 A * | 3/1995 | Hamilton | ...................... | 248/279.1 |
| 5,405,117 A * | 4/1995 | Davis | ...................... | 248/333 |
| 5,487,524 A | 1/1996 | Bergetz | | |

(Continued)

*Primary Examiner*—Terrell Mckinnon
*Assistant Examiner*—Erin Smith
(74) *Attorney, Agent, or Firm*—Foley & Lardner LLP

(57) ABSTRACT

A ceiling mounting system configured to provide height and viewing angle adjustment for a flat panel display mounted thereon. An adapter plate attaches to at least one rear surface of a flat panel display. A tube, at a first end, is pivotally attached to the adapter plate, while the tube, at a second end is attached to a ceiling decoupler. The ceiling decoupler has integrated therein, a return to zero mechanism configured to withstand impact to the ceiling mounting system and/or flat panel display, and return to a default position once the impact is released. Various related media components can also be secured to the adapter plate, while the tube, in conjunction with the adapter plate allows for cable and cord routing and management. A back cover slidably engages the adapter plate to hide the rear of the flat panel display and any related media components, cables, and cords.

21 Claims, 13 Drawing Sheets

U.S. PATENT DOCUMENTS

| | | |
|---|---|---|
| D388,646 S | 1/1998 | Canton Gongora et al. |
| D394,570 S | 5/1998 | Walters, III |
| D399,200 S | 10/1998 | Rosen |
| 6,073,892 A * | 6/2000 | Dittmer ................. 248/157 |
| 6,557,285 B2 * | 5/2003 | Walsh, Jr. ............... 40/617 |
| 6,811,130 B1 * | 11/2004 | Oh ....................... 248/343 |
| 7,267,314 B1 * | 9/2007 | Erickson ................ 248/333 |
| 7,320,454 B2 * | 1/2008 | Lee et al. .............. 248/343 |
| D563,700 S | 3/2008 | Walters et al. |
| 2002/0083631 A1 * | 7/2002 | Walsh, Jr. .............. 40/617 |
| 2004/0135050 A1 * | 7/2004 | Lee et al. .............. 248/317 |
| 2005/0092888 A1 * | 5/2005 | Gonce .................. 248/324 |
| 2008/0030939 A1 * | 2/2008 | Gillespie et al. ........ 361/681 |

* cited by examiner

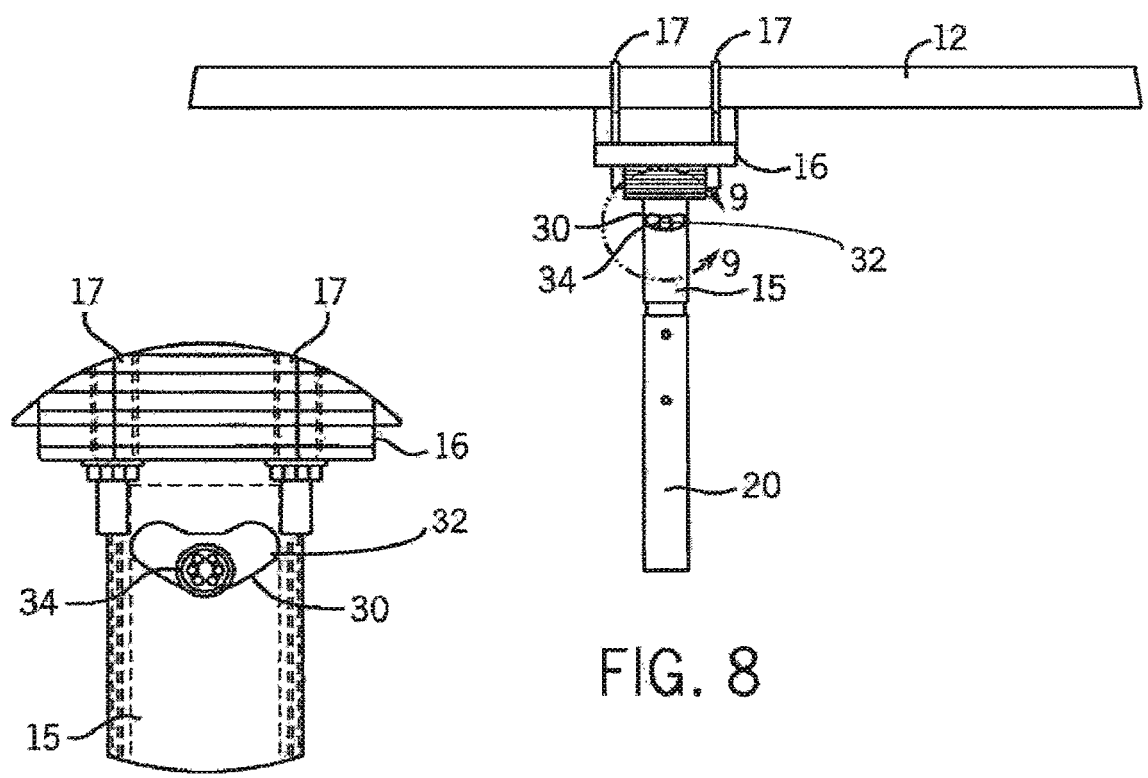
FIG. 8
FIG. 9
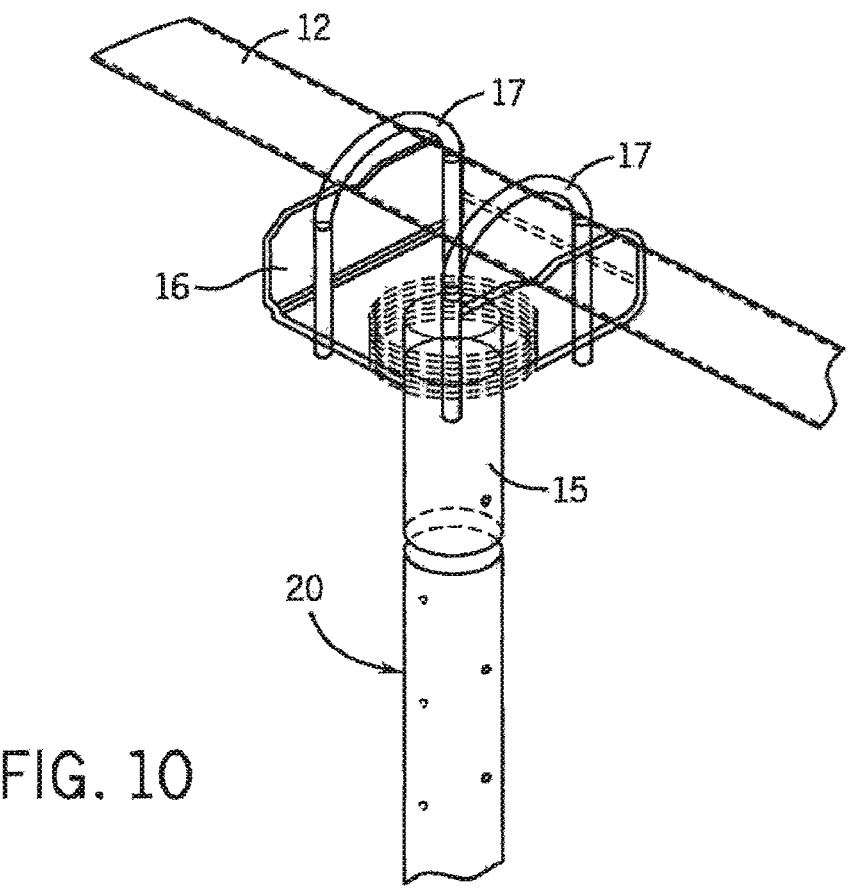
FIG. 10

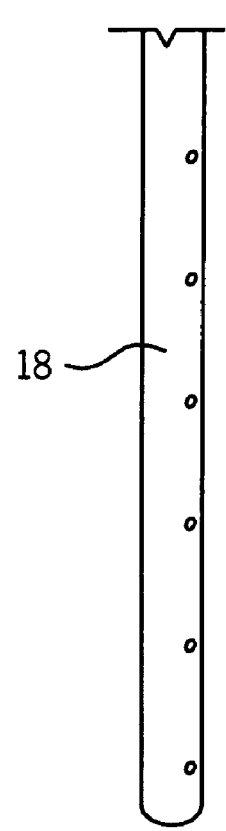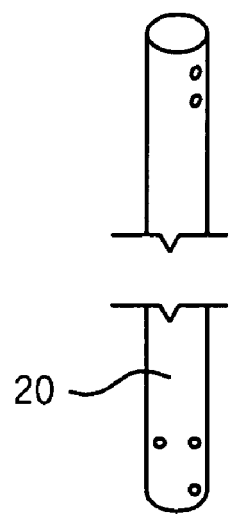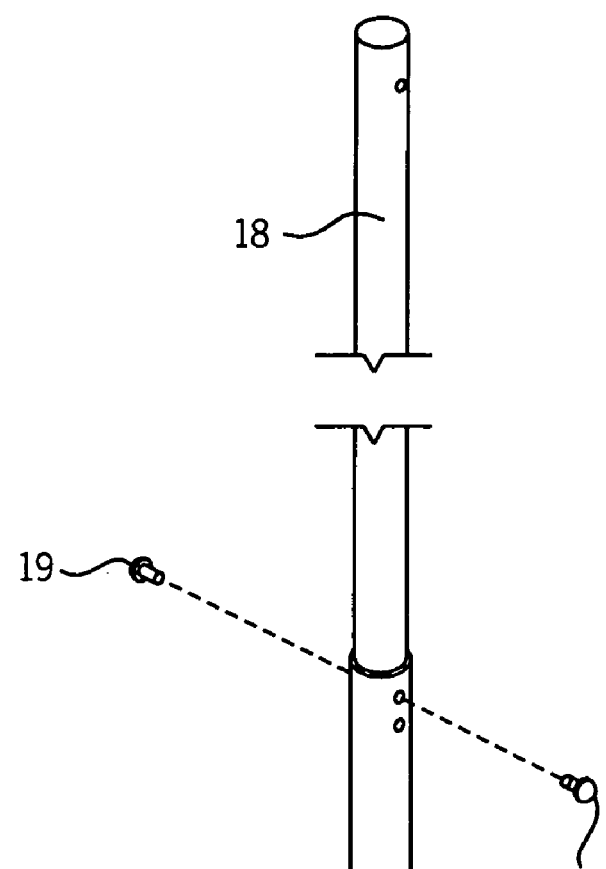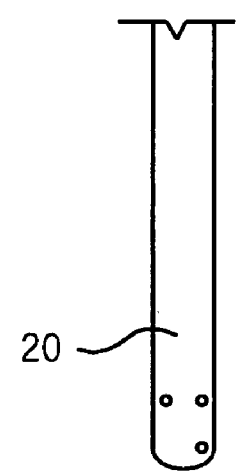
FIG. 11    FIG. 12

CEILING MOUNTING SYSTEM

CROSS-REFERENCE TO RELATED PATENT APPLICATIONS

The present application is a continuation-in-part of U.S. Design Pat. Application 29/263,667, filed on Jul. 27, 2006. This application also claims priority to U.S. Provisional Patent Application 60/856,140, filed Nov. 2, 2006. Both applications are incorporated herein by reference in their entirety.

FIELD OF THE INVENTION

The present invention relates generally to mounting systems. More particularly, the present invention relates to ceiling mounting systems for use with devices such as flat panel televisions.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, flat panel televisions have become enormously popular in both the commercial and residential sectors. As the prices for plasma and liquid crystal display (LCD) flat panel displays have continued to fall, and the quality for the same devices have improved, more and more businesses and individuals have purchased such devices for both home and business entertainment purposes.

Although the introduction of flat panel televisions on a wide scale has presented new opportunities to both residential and commercial customers, it has also presented new challenges. In particular, flat panel televisions, while usually having significantly smaller depth or profile than conventional "tube" televisions, tend to be quite heavy. Particularly for flat panel televisions with large screens, this weight can become also prohibitively great. With such large weights involved, it is especially important that users can easily, safely, and securely mount devices. Furthermore, with such weights involved and the high cost of such devices, it is extremely important that the device be mounted correctly on the first attempt: if the device is not correctly mounted on the first try, there is a high risk of damaging the device and causing injury to those installing it.

In addition, with recent advances in media content and media delivery, more media components such as set top boxes, personal computer (PC)/receivers, and specialized speakers are utilized in conjunction with flat panel displays. Co-locating such media components with the flat panel display also aids in freeing up potentially valuable floor space, as well as makes operation of the various media components more convenient. Furthermore, the installation of the various media components is made more convenient as routing and connecting wires, for example, have less distance to travel between connected media components. However, co-locating these media components with conventional ceiling mounts is complicated and conventionally results in visually unappealing, cluttered configurations.

Yet another aspect of consideration to be taken into account with flat panel displays is viewing angle. Certain flat panel displays have stricter requirements regarding satisfactory angles from which the flat panel display can be viewed. Therefore, any mounting system, ceiling or otherwise, needs to be adjustable to allow for these optimum viewing angles.

Conventional mounting systems, and in particular, ceiling mounting systems, require a plethora of hardware for installation and attaching devices thereto and tend to have an industrial appearance. In addition, conventional mounting systems must generally be configured for specific devices and specific ceiling types, e.g., specific truss sizes, thereby lacking common hardware and convenient adaptability. Also, conventional ceiling mounting systems are generally more fragile in nature, as no mechanisms for dealing with impacts are utilized.

SUMMARY OF THE INVENTION

Various embodiments of the present invention provide a ceiling mounting system for use with a variety of devices, especially media display devices such as flat panel televisions. A media display device is secured in the ceiling mounting system via an adapter plate configured to attach to one or more rear surfaces of the media display device. A non-extendable or extendable tube is pivotally attached at its first end to the adapter plate in the various embodiments of the present invention to provide height and viewing angle adjustment. The non-extendable or extendable tube is also attached at its second end to a ceiling decoupler. The ceiling decoupler is used in the various embodiments of the present invention to secure the ceiling mounting system to a cross support rod, or other support structure, where the ceiling support rod in turn, is secured to ceiling trusses or some other ceiling structure(s). A "return to zero" mechanism integrated into the ceiling decoupler is configured to withstand impact to the flat panel television and/or the ceiling mounting system, and return to a default position once the impact is released.

In addition to the flat panel television, other related media components, such as a speaker(s), a set top box, and/or a PC/receiver can be secured to the adapter plate. A back cover can slidably engage the adapter plate to hide the rear of the flat panel television and any media components secured thereto from plain view. In addition, any cables connecting the related media components, for example, are hidden as well. The non-extendable and extendable tubes also allow a cable or cables to be routed therein, also hiding them from plain view.

The various embodiments of the present invention allow for an aesthetically clean and pleasing appearance to ceiling mounted flat panel displays, while also providing a convenient system for co-locating related media components. Installation and configuration of the flat panel display and media components is convenient and easily adaptable to components from different manufacturers, and to various ceiling types and support structures. In addition, because of the "return to zero" mechanism, the need for a user to re-adjust or re-position the ceiling mounting system due to impacts to the flat panel display and/or ceiling mounting system is negated.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 8 is a frontal view of a return to zero mechanism integrated into a ceiling mounting system constructed in accordance with various embodiments of the present invention;

FIG. 9 is a close-up frontal view of the return to zero mechanism shown in FIG. 8.

FIG. 10 is a close-up, perspective view of a height adjusting mechanism integrated into a ceiling mounting system constructed in accordance with various embodiments of the present invention;

FIG. 11 shows a method of installing an extension column for a ceiling mounting system constructed in accordance with various embodiments of the present invention;

FIG. 12 shows a method of securing the extension column of FIG. 11;

DETAILED DESCRIPTION OF THE PREFERRED EMBODIMENTS

Figure 1:
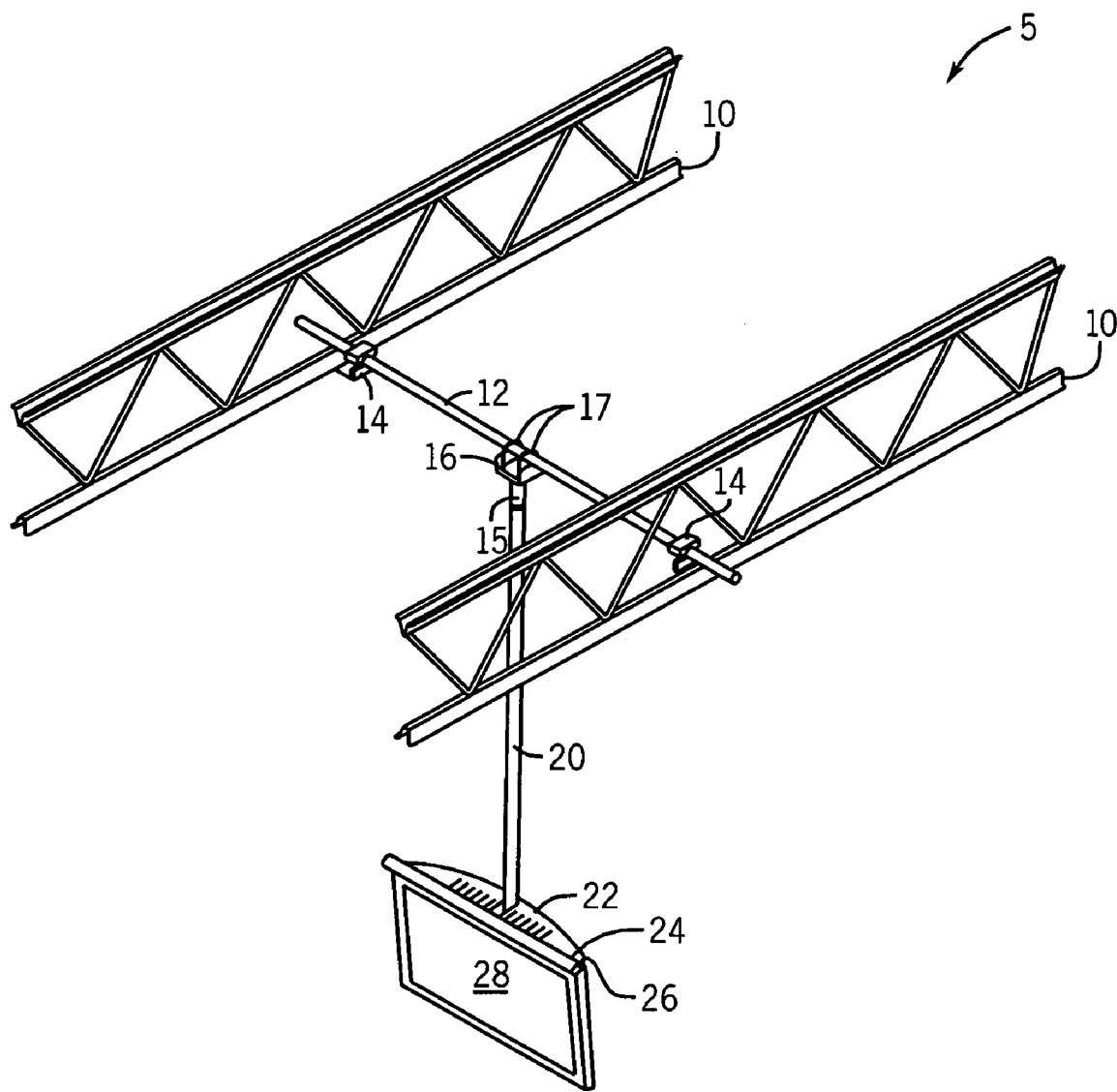
FIG. 1 is a perspective view of a ceiling mounting system constructed in accordance with various embodiments of the present invention.

FIG. 1 shows a ceiling mounting system 5 constructed in accordance with various embodiments of the present invention. As shown in FIG. 1, the ceiling mounting system 5 can be comprised of a plurality of elements, for example, a cross support rod 12, two side brackets 14, a ceiling decoupler 16, an inner and outer tubes tubes 18 and 20, a back cover 22, and a speaker plate 24. A flat panel display 28 or other audio/video device can be installed in the ceiling mounting system 5 and hung as illustrated in FIG. 1. FIG. 1 shows the ceiling mounting system 5 mounted to the cross support rod 12, which is securely held between two trusses 10 by the side bracket 14.

FIG. 1 also illustrates how a speaker 26 can be mounted along a top edge of the flat panel display 28 with a speaker plate 24 that is utilized in conjunction with the ceiling mounting system 5. It is generally advantageous to position the speaker 26 along the top edge of the flat panel display 28 in order to achieve a "center speaker" effect. However the various embodiments of the present invention do not limit placement of the speaker 26. Alternatively, the speaker 26 can be mounted along either side as well as along a bottom edge of the flat panel display 28. Furthermore, more than one speaker can be mounted, such as a center speaker along the top edge as discussed above, and left and right speakers along the left and right sides of the flat panel display 28.

Figure 2:
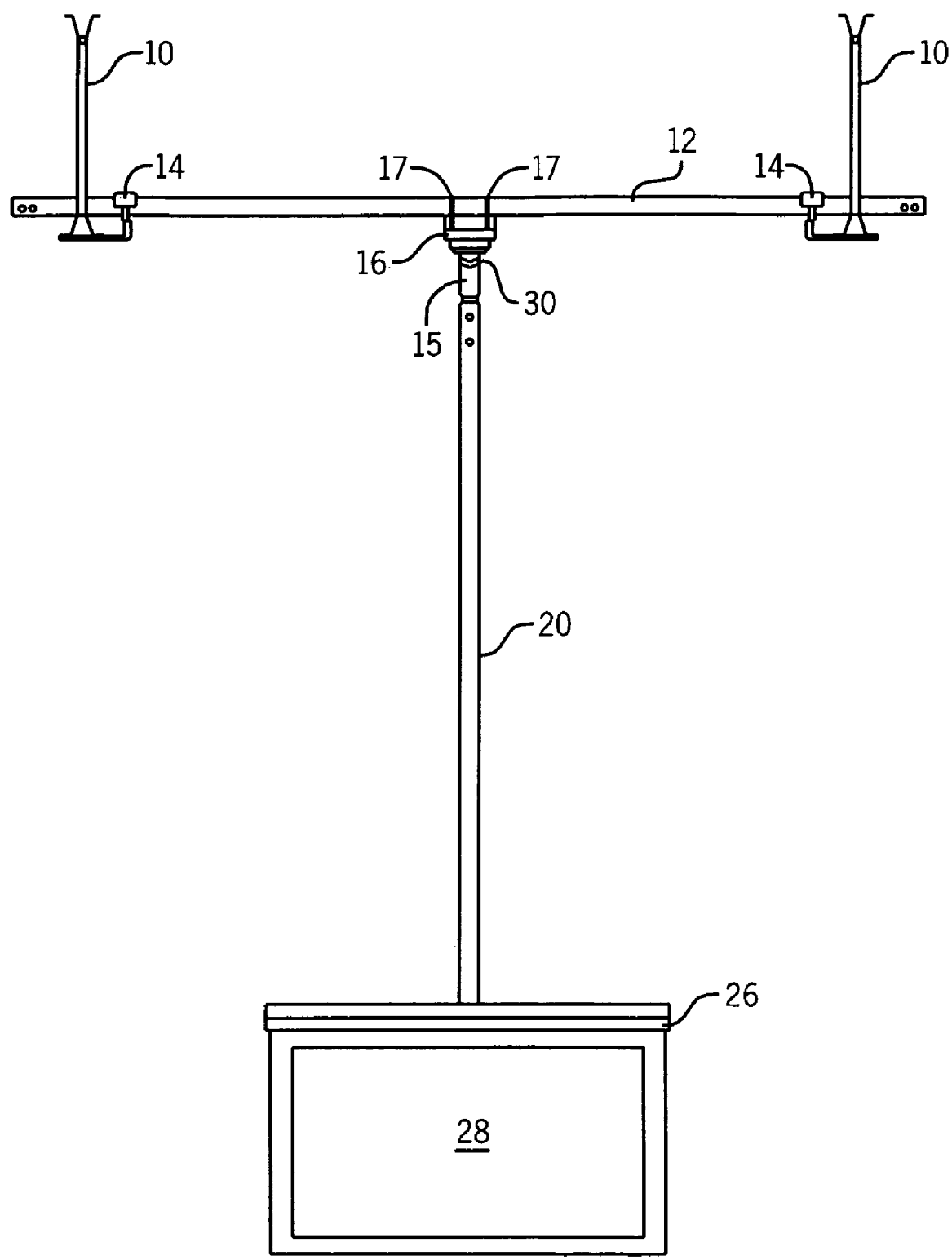
FIG. 2 is a front view of the ceiling mounting system of FIG. 1.

Referring to FIGS. 2, 7, 8, and 9, a "return to zero" mechanism 30 is illustrated. FIG. 2 shows the ceiling mounting system 5 in a default position, i.e., the inner and outer tubes 18 and 20 are positioned substantially perpendicular to the cross support rod 14. It is contemplated that due to a plurality of reasons, the alignment of the ceiling mounting system 5 can be disturbed. For example, natural occurrences such as earthquakes can induce movement of the trusses 10, the cross support rod 12, the ceiling decoupler 16, and/or the flat panel display 28 itself. It is also contemplated that the flat panel display 28 can be inadvertently jostled or moved by a person depending on the height at which the flat panel display 28 is hung. Furthermore, various machinery such as cranes and forklifts might also inadvertently jostle the flat panel display 28 while moving about, for example, when setting up a convention site utilizing flat panel displays. The return to zero mechanism 30 allows such movement to occur without permanently altering the positioning of the ceiling mounting system 5, and ultimately, the flat panel display 28.

FIGS. 8 and 9 show a close-up of the return to zero mechanism 30, which is comprised of at least a centering bolt 34 and a centering channel 32. The arrow illustrated in FIG. 8 indicates a magnified view of the return to zero mechanism shown in FIG. 9. When the ceiling mounting system 5 experiences the movement described above, the centering bolt 34 is allowed to travel within the centering channel 32. Because the centering channel 32 is substantially "V"-shaped, the weight of the ceiling mounting system 5 and/or the flat panel display 28 forces the centering bolt 34 to rest in a default position once the impact causing the movement is released. That default position can be at the bottom of the V-shaped portion of the centering channel 32 as shown in FIGS. 8 and 9. It should be noted that the centering channel 32 can be substantially, "U"-shaped, arc-shaped, or shaped in any other manner that permits the centering bolt 34 to return to some default position. Likewise, the default position need not be when the inner tube 18 is substantially perpendicular to the cross support rod 12. It should further be noted that the u-bolts 17 can also act as a return to zero mechanism due their shape, the manner in which they are attached via the ceiling decoupler 16, and the weight of the ceiling mounting system 5 and/or the flat panel display 28. Alternatively, a second return to zero mechanism can be integrated in the ceiling decoupler 16 as well in an orientation perpendicular to the return to zero mechanism 30. This would allow for the counteraction of movement perpendicular to that of the rotational movement discussed above.

Figure 3:
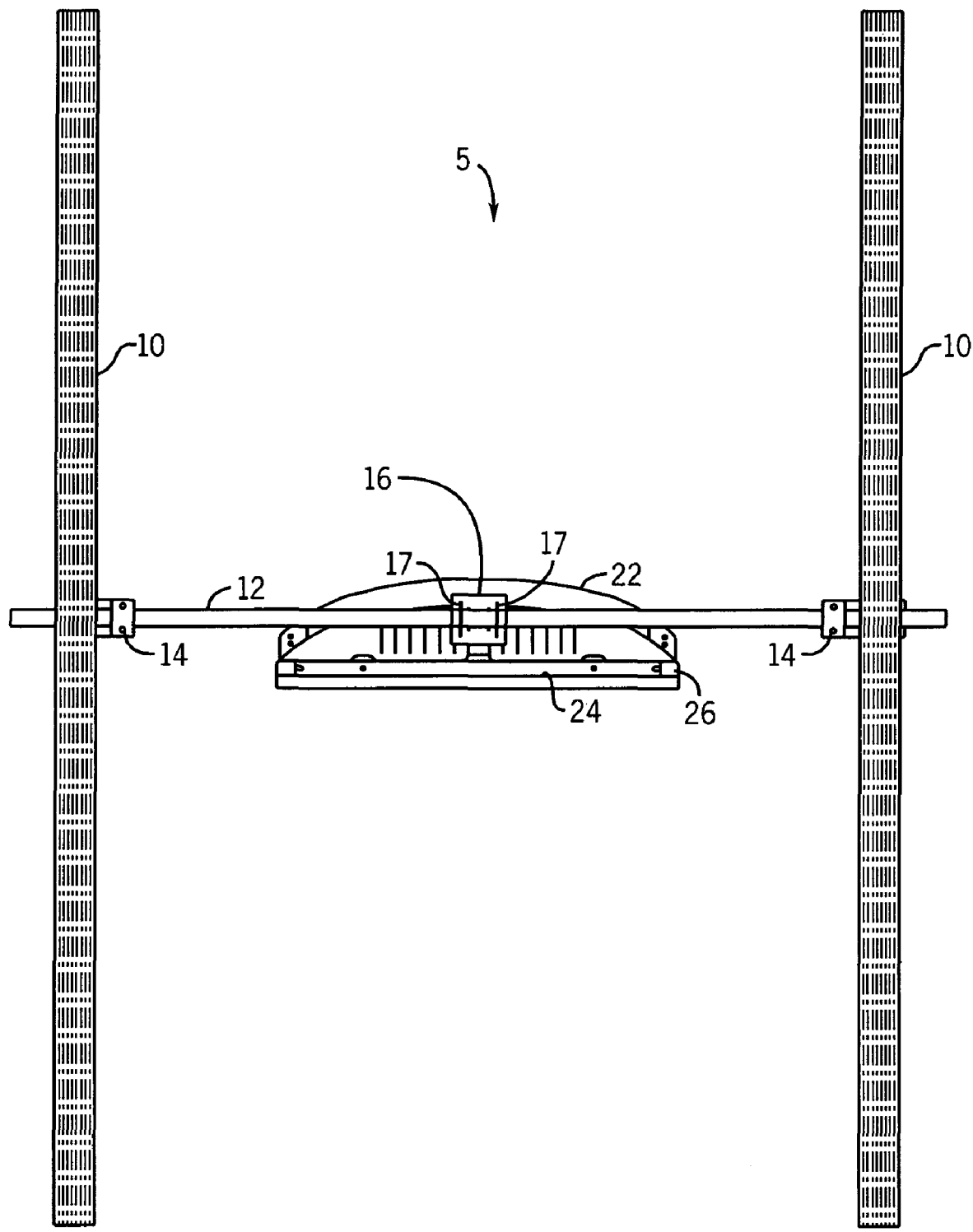
FIG. 3 is a top view of the ceiling mounting system of FIG. 1.
Figure 4:
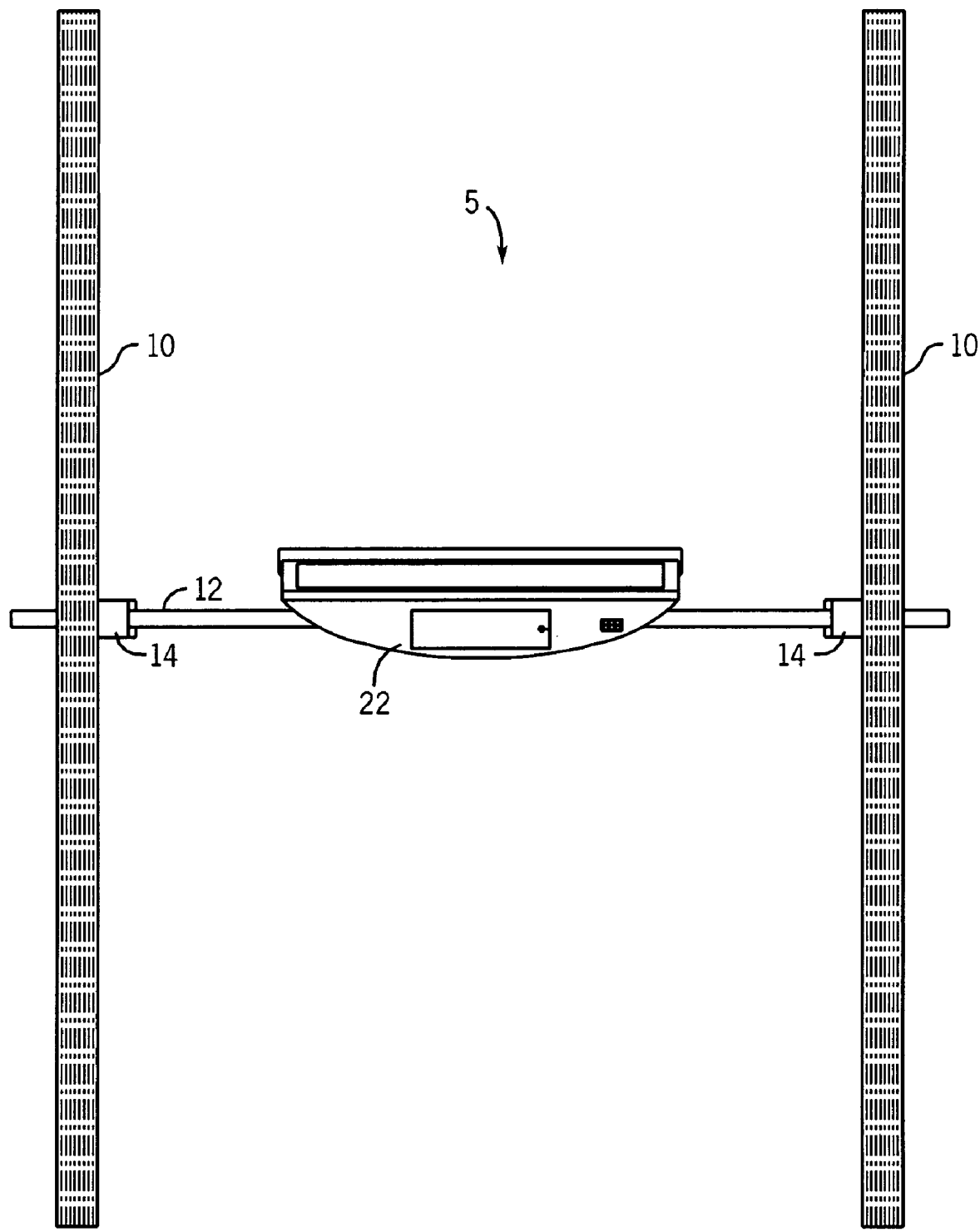
FIG. 4 is a bottom view of the ceiling mounting system of FIG. 1.
Figure 7:
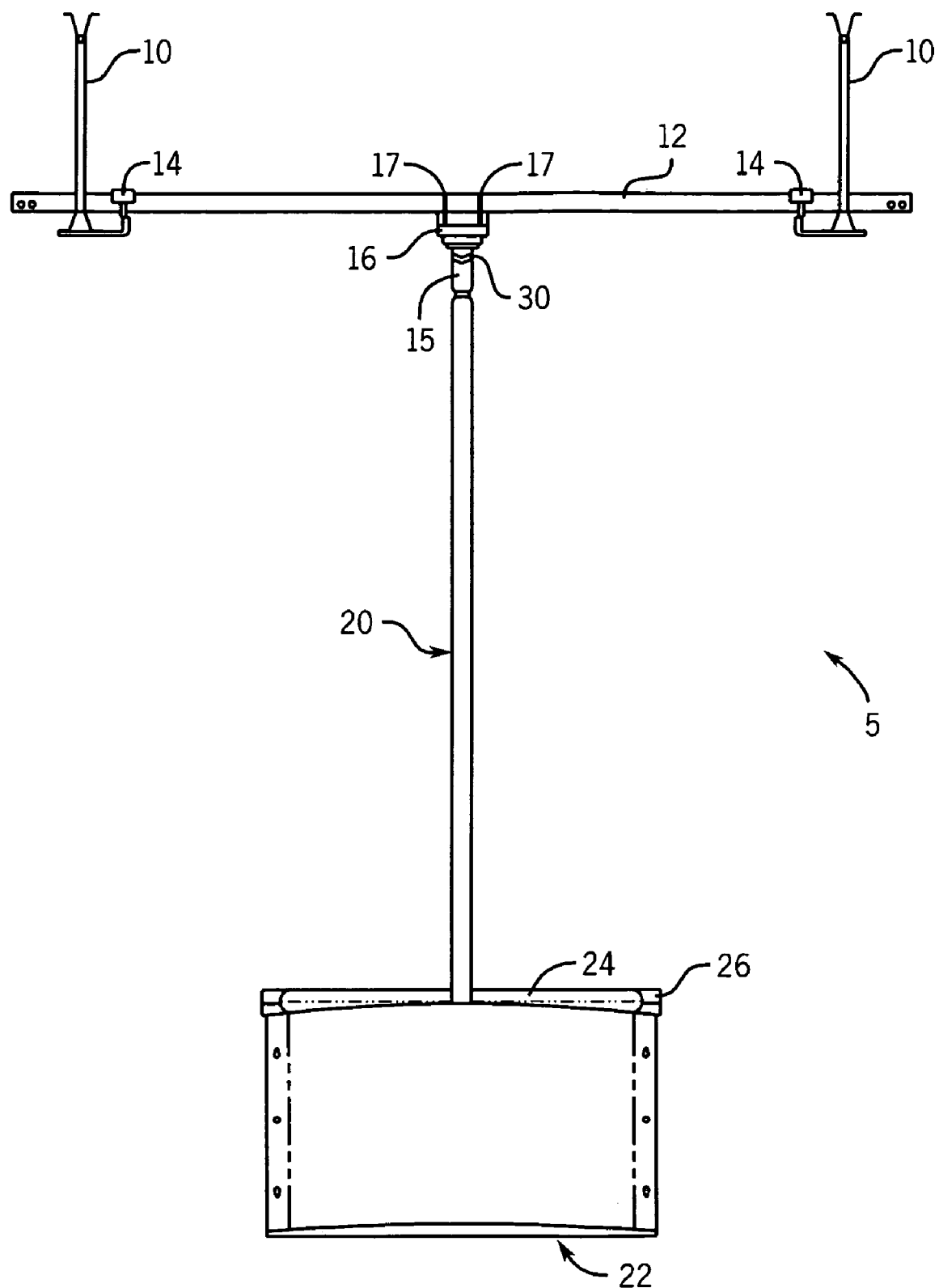
FIG. 7 is a back view of the ceiling mounting system of FIG. 1.
Figure 15:
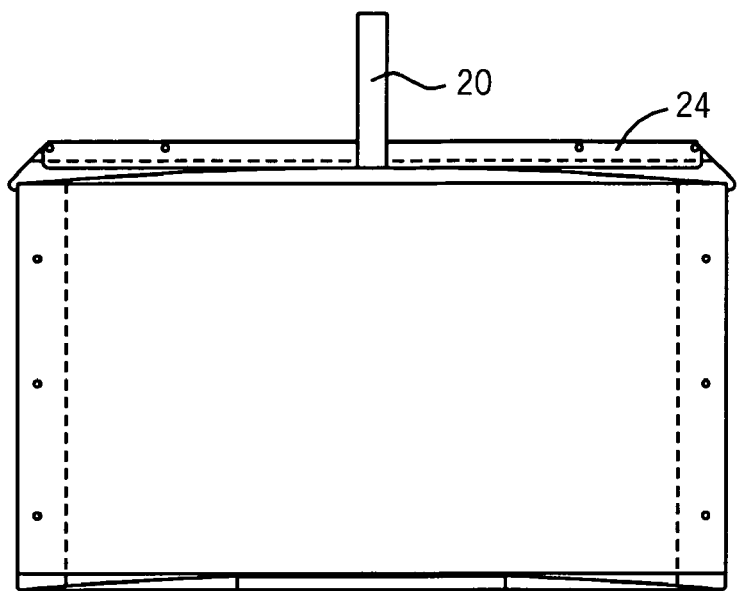
FIG. 15 is a back view of a back cover utilized in conjunction with a ceiling mounting system constructed in accordance with various embodiments of the present invention.

FIGS. 3 and 4 show top and bottom views, respectively, of the ceiling mounting system 5. These views illustrate the back cover 22 of the ceiling mounting system 5 which provides a cleaner, uncluttered configuration resulting in a visually aesthetic look. As will be discussed in greater detail below, various cords, media components, and other related elements can be hidden from view. FIGS. 7 and 15 also illustrate the back cover 22 and the uncluttered look of the ceiling mounting system 5 that can be achieved with the various embodiments of the present invention.

Figure 5:
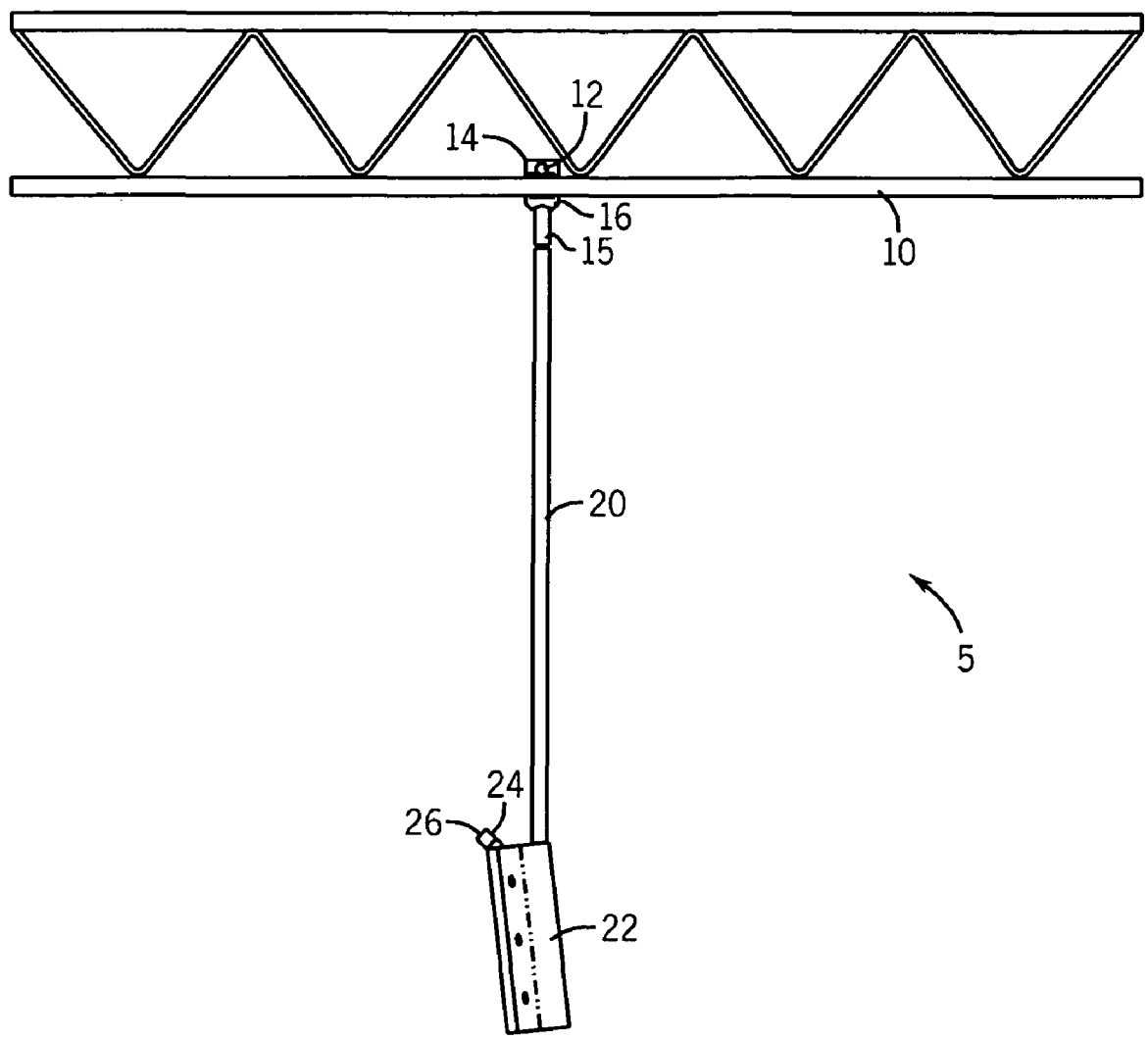
FIG. 5 is a first side view of the ceiling mounting system of FIG. 1.
Figure 6:
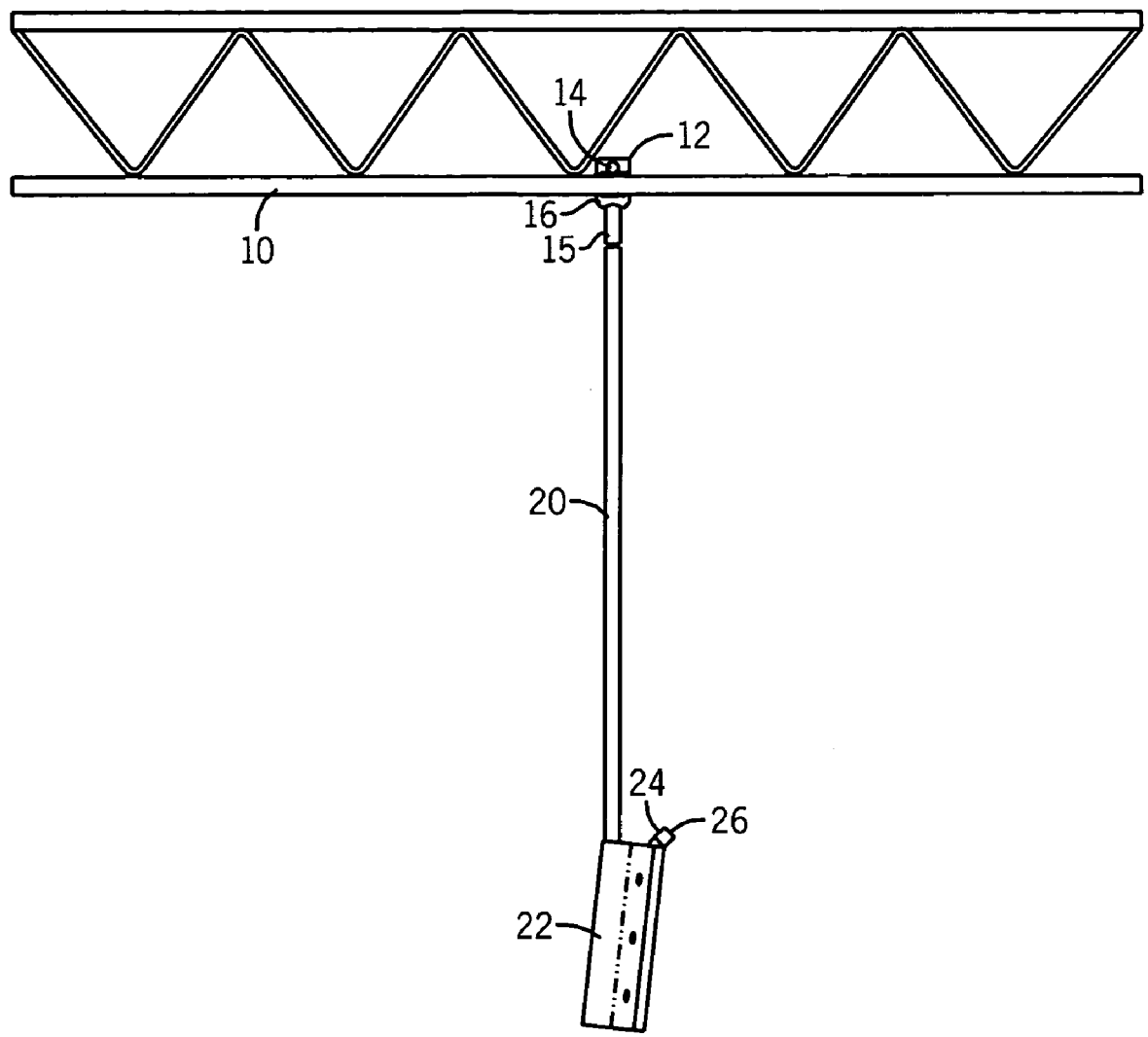
FIG. 6 is a second side view of the ceiling mounting system of FIG. 1.
Figure 18:
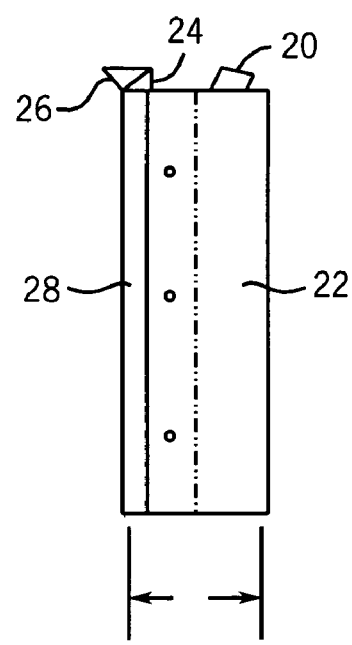
FIG. 18 is a side view of the flat panel television and various related components of FIG. 16.

FIGS. 5, 6, and 18 show various side views of the ceiling mounting system 5 and the flat panel display 28. It should be noted that the flat panel display 28 can be oriented at various angles in relation to the front of the flat panel display 28 as shown. The ability to alter the angular orientation allows a user of the ceiling mounting system 5 to optimize the viewing angle of the flat panel display 28. For example, if the ceiling mounting system 5 is hung further down from a ceiling and closer to the ground, a more upright angular orientation would be appropriate as a person viewing the flat panel display 28 is likely to be nearer in height to the flat panel display 28. On the other hand, if the ceiling mounting system 5 is hung closer to the ceiling and further from the ground, a person viewing the flat panel display 28 would have to look up towards the ceiling. Therefore, a more downward angle of orientation of the flat panel display 28 would be appropriate.

Figure 19:
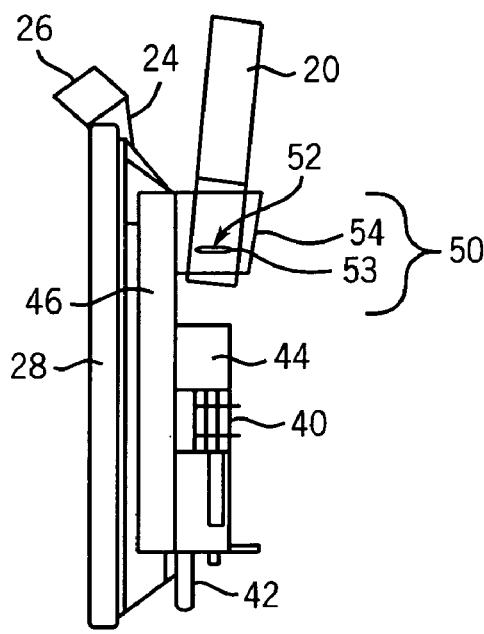
FIG. 19 is a side view of an angle adjustment mechanism of a ceiling mounting system constructed in accordance with various embodiments of the present invention.

FIG. 19 shows how the angular orientation of the ceiling mount system 5, and ultimately, the flat panel display 28 is made possible. An angling mechanism 50 comprises a pivot point 52 and a pivot bracket 54. The pivot bracket 54 accepts the inner tube 18 and the pivot point 52 secures the inner and outer tubes 18 and 20 within the pivot bracket 54 at a desired angle from the adapter plate 46. The pivot point 52 can comprise a screw or other similar fastener that is configured to be fitted through a pivot slot 53 integrated into the pivot bracket 54, thus securing the inner and outer tubes 18 and 20 within the pivot bracket 54 at the above-mentioned desired angle. It should be noted that additional screws or similar fasteners (not shown) may be utilized to aid in retaining the inner tube 18 at its desired angle. Alternatively, the pivot bracket 54 can be manufactured to orient the adapter plate 46 at a preset angle. In addition, the inner and outer tubes 18 and 20 can also be rotated within the pivot bracket 54 thus allowing the flat panel display 28 to also be rotated substantially around an axis defined by the length of the inner and outer tubes 18 and 20. Once the degree of desired rotation is achieved, the pivot point 52 as well as other screws or fasteners (not shown) can be tightened to substantially, non-moveably secure the inner and outer tubes 18 and 20 to the pivot bracket 54.

FIG. 10 shows a detailed view of the ceiling decoupler 16 as constructed according to one embodiment of the present invention. A cylindrical bottom portion 15 of the ceiling decoupler 16 accepts the inner tube 18, which is in turn secured via at least two screws. It should be noted that other methods of securely attaching the inner tube 18 to the ceiling decoupler 16 can be utilized. For example, instead of attaching the inner tube 18 to the cylindrical bottom portion 15 via a separate screw, the inner tube 18 can be constructed to screw itself into the cylindrical bottom portion 15. Alternatively, the cylindrical bottom portion 15 need not be used at all, where the inner tube 18 can be screwed directly into a threaded portion of the ceiling decoupler 16 (not shown).

To attach the ceiling decoupler 16 to the cross support rod 12, at least two u-bolts 17, or other applicable fasteners are placed over the cross support rod 12 and securely attached to the ceiling decoupler 16. The u-bolts 17 may be attached to the ceiling decoupler 16 via a plurality of securing mechanisms including, but not limited to nuts, split washers, and clamps. Once the u-bolts 17 are secured to the ceiling decoupler 18, the inner tube 18 hangs substantially perpendicular to the cross support rod 12. In addition, an installer can choose how tightly the ceiling mounting system 5, via the inner tube 18, is clamped to the cross support rod 12. The tighter the u-bolts 17 are attached to the ceiling decoupler 16, the less movement the ceiling mount 5 will experience, either by inadvertent jostling of the flat panel display 18, ceiling trusses 10, and/or the cross support rod 12. However, as described above, if the u-bolts 17 are attached to the ceiling decoupler 16 in a looser fashion, movement can be experienced by the ceiling mounting system 5, but the weight of the ceiling mounting system 5 and/or the flat panel display 28 will return the ceiling mounting system 5 to the substantially perpendicular default position once the impact causing the movement is released.

The height adjustment aspect of the ceiling mounting system 5 is illustrated in FIGS. 11 and 12. The inner tube 18 has a plurality of holes or slots integrated along its length. An outer tube 20, having an inner diameter slightly larger than the inner tube 18, can be fitted over the inner tube 18 and secured by two screws 19, or other similar retaining devices. It should be noted that the two screws 19 are configured so that they do not completely pass through the inner and outer tubes 18 and 20 in order to provide clearance for cables, cords, etc. routed through the inner and/or outer tubes 18 and 20. The outer tube 20 can be positioned at different heights along the inner tube 18 (commensurate with the plurality of holes or slots) and held in place by the screws 19. It should be noted that the ceiling mounting system 5 can be utilized with or without the outer tube 20. FIGS. 11 and 12 also show that the inner and outer tubes 18 and 20 are hollow, thus allowing for the routing of cables, cords, etc. through the inner and/or outer tubes 18 and 20 to or from the flat panel display 28 and any other co-located media components as noted above. Although it is not shown, it should further be noted that the inner tube 18 can also be configured with a cable access port so that cables and lines can be routed therein as well when the outer tube 20 is not utilized.

Figure 13:
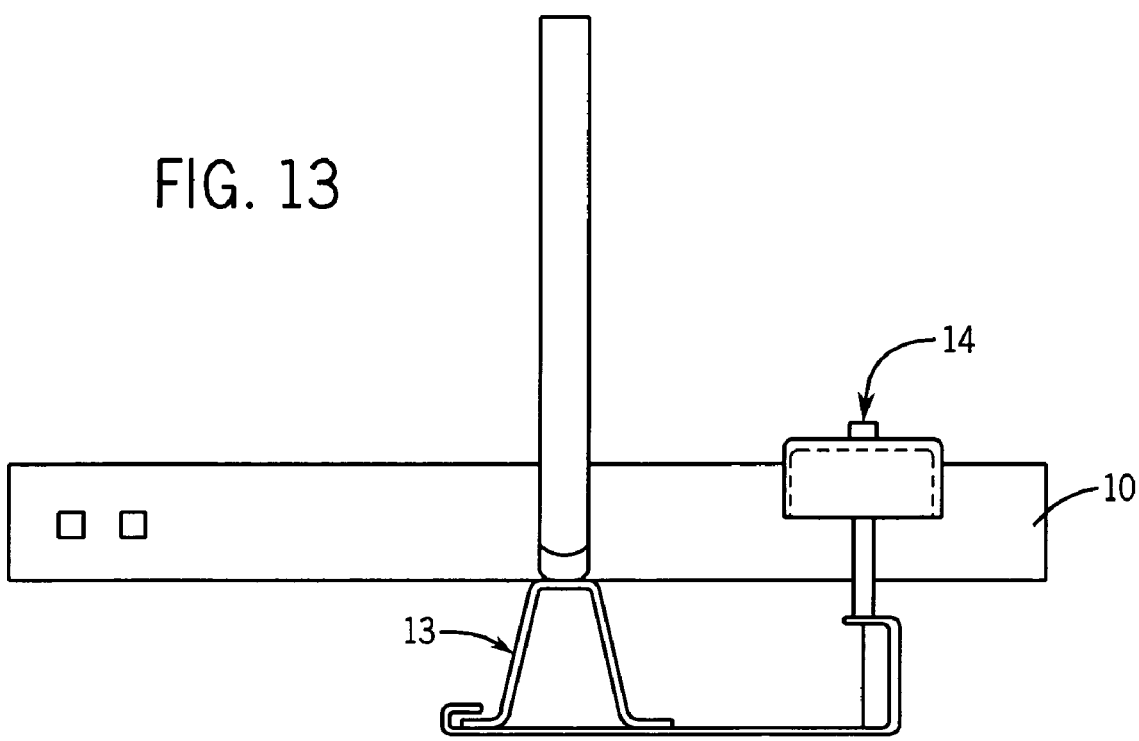
FIG. 13 is a side view of a universal side bracket utilized to secure a truss for a ceiling mounting system constructed in accordance with various embodiments of the present invention.
Figure 14:
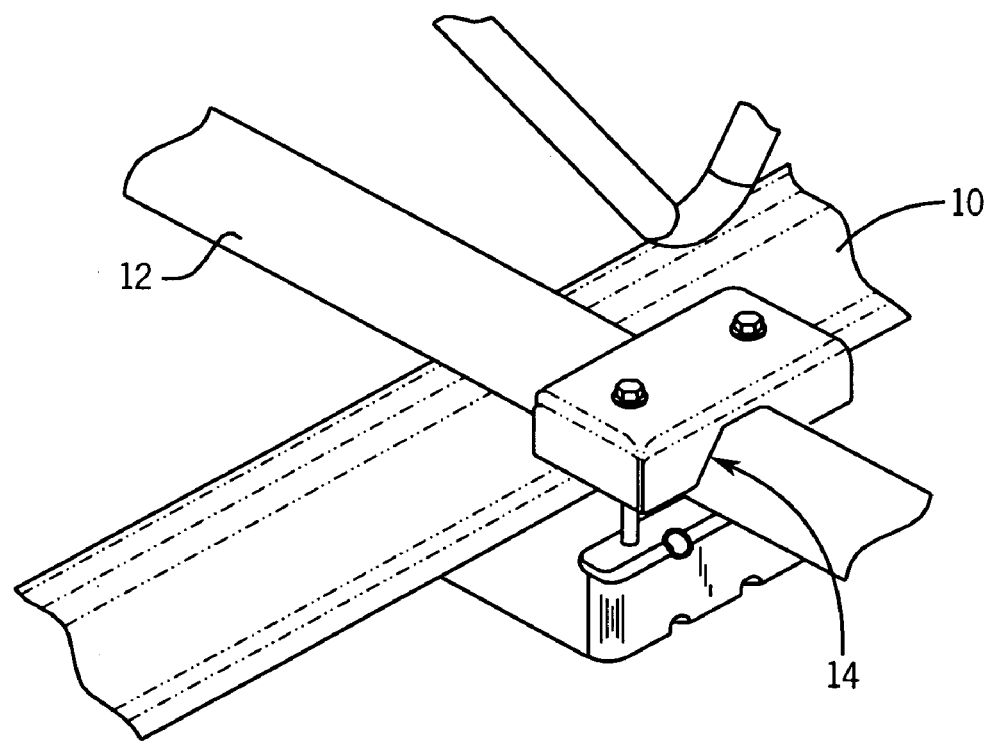
FIG. 14 is a perspective view of the universal side bracket of FIG. 13.

FIGS. 13 and 14 show in more detail, one of the side brackets 14 discussed previously. Referring back to FIG. 1, at least two of the side brackets 14 are utilized to mount the ceiling mounting system 5 to the two ceiling trusses 10. FIGS. 13 and 14 illustrate one of the two side brackets 14, where each side bracket 14 is configured as a clamp that secures the cross support rod 12 to the ceiling truss 10. It should be noted that the cross support rod 12 can be clamped to either the top or the bottom of the ceiling truss 10. In addition, a strut 13 is utilized in the various embodiments of the present invention to accommodate varying thicknesses of ceiling trusses. Also, the side bracket 14 itself can accommodate varying widths and heights of struts as shown in FIG. 13.

Figure 16:
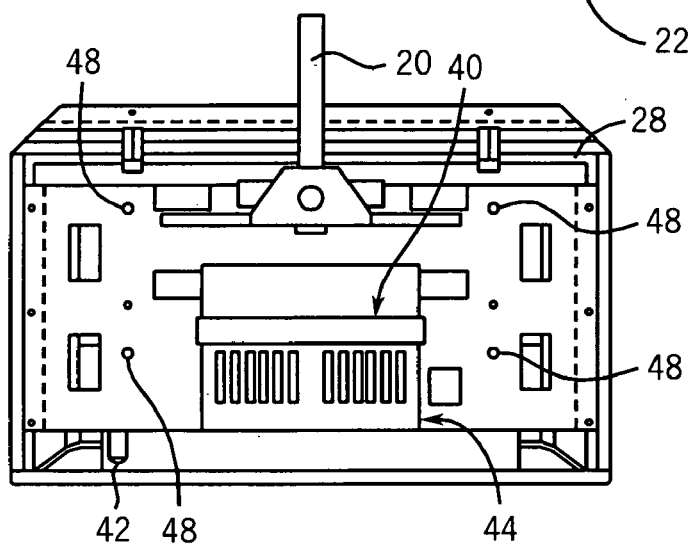
FIG. 16 is a back view of a flat panel television and various related components capable of being installed in a ceiling mounting system constructed in accordance with various embodiments of the present invention.
Figure 17:
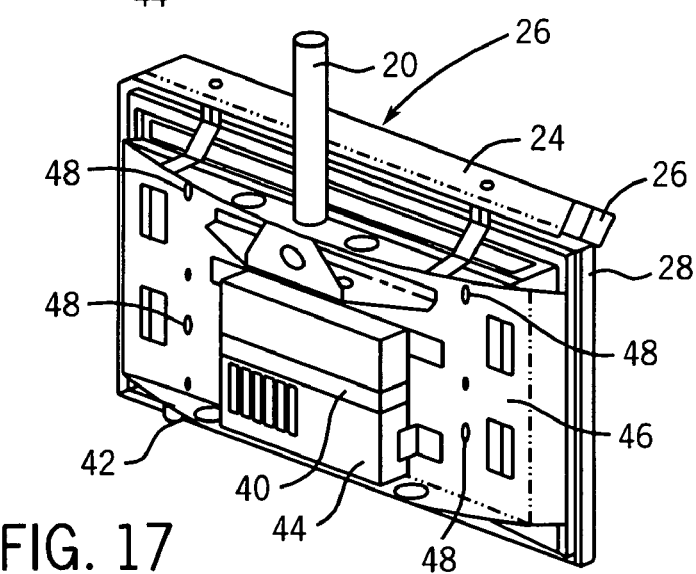
FIG. 17 is a perspective view of the flat panel television and various related components of FIG. 16.
Figure 20:
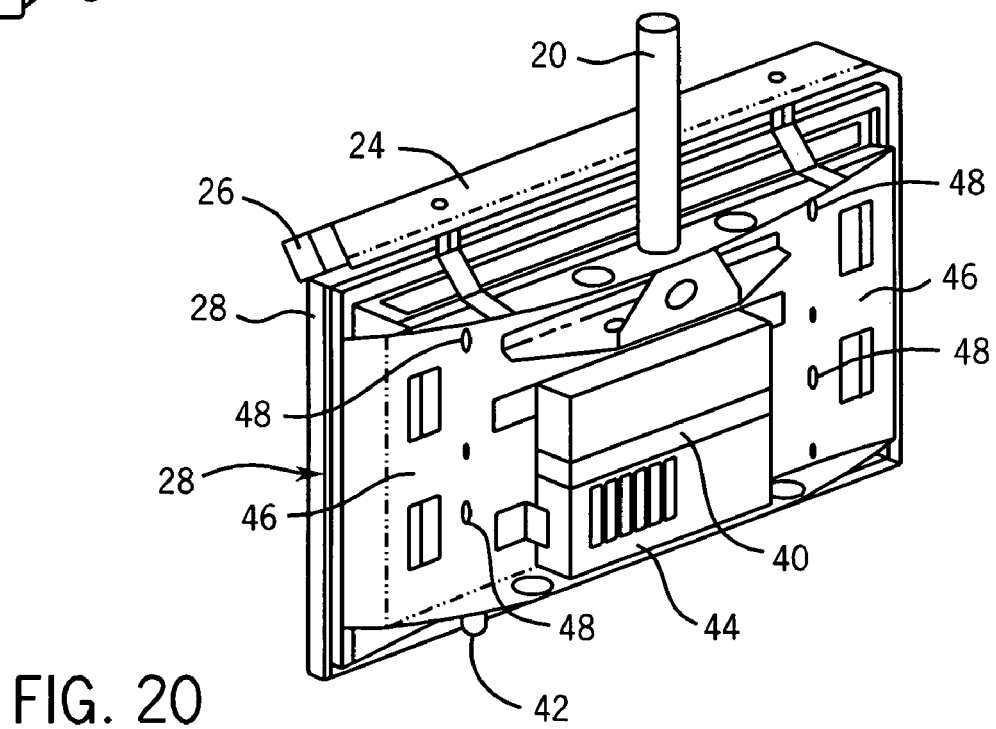
FIG. 20 a perspective view of an adapter utilized to connect a flat panel television and various related components to a ceiling mounting system constructed in accordance with various embodiments of the present invention.

FIGS. 16, 17, and 20 show that the ceiling mounting system 5 also comprises an adapter plate 46. Flat panel displays incorporate various mounting screw holes (not shown) in varying configurations on their rear panels. An installer can install fasteners (not shown) in one or more of the mounting screw holes. The adapter plate 46 attaches to the back side of the flat panel display 28 by matching mounting keyholes 48 to the one or more screws installed into the one or more mounting screw holes. The inner tube 18 or the outer tube 20 also attaches to the adapter plate 46. This attachment point effects the angling mechanism 50 described above.

In addition, the speaker plate 24 also attaches to the adapter plate 46 in various embodiments of the present invention. The adapter plate 46 can also accommodate a co-located media component such as a set top box or PC/receiver 44. A box bracket 40 comprises a hinged member that is attached to the adapter plate 46 at a first attachment point, can be swung open to accept the set top box or PC/receiver 44, and can be closed around the set top box of PC/receiver to secure it to the adapter plate 46 at a second attachment point. A plurality of hinge types and closing mechanisms can be used in the various embodiments of the present invention. It should be noted that because of the varying configurations of mounting screw holes and the mounting keyholes 48 described above, the adapter plate 46 can be adapted to orient the flat panel display 28 in a horizontal as well as a vertical orientation.

An infrared (IR) receiver 42 can also be integrated with the adapter plate. The IR receiver 42, although shown as being integrated in the adapter plate 46 at a lower corner, can be located anywhere along an edge or surface of the adapter plate 46. This allows the IR receiver 42 to be located in an optimal location for receiving IR signals from, for example, an IR remote control used to control the flat panel display 28, the set top box or PC/receiver 44, and/or any other media component co-located on or with the ceiling mounting system 5.

The adapter plate 46 is configured to allow attachment of the back cover 22 thereto. The back cover 22 can have guide protrusions (not shown) that align with guide grooves integrated into the adapter plate 46. The back cover 22 can be configured to be slid onto the adapter plate 46, thus reducing additional hardware to attach the back cover 22 to the adapter plate 46. In addition, slidably attaching the back cover 22 to the adapter plate 46 creates a convenient method of attaching and removing the back cover to access the rear of the flat panel display 28 and any related media components co-located on or with the ceiling mounting system 5. Alternatively, the back cover 22 can be "snap-fit" onto the adapter plate 46. As is shown in FIG. 15, for example, when the back cover 22 is attached to the adapter plate 46, a clean and uncluttered appearance is achieved. All cables or cords that are routed through the inner tube 18 and/or the outer tube 20 as described above, and any co-located media components, such as the set top box or PC/receiver 44 also described above, are hidden from plain view by the back cover 22. In addition, internal cord and cable routers (not shown) on the adapter plate allow for cord and cable management.

Figure 21:
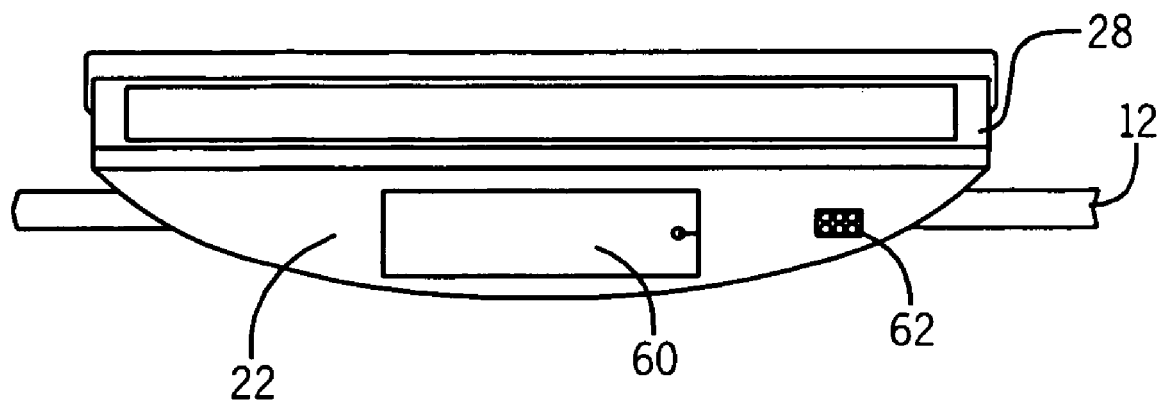
FIG. 21 shows a quick access cover and integrated infrared (IR) remote screen of a ceiling mounting system constructed in accordance with various embodiments of the present invention.
Figure 22:
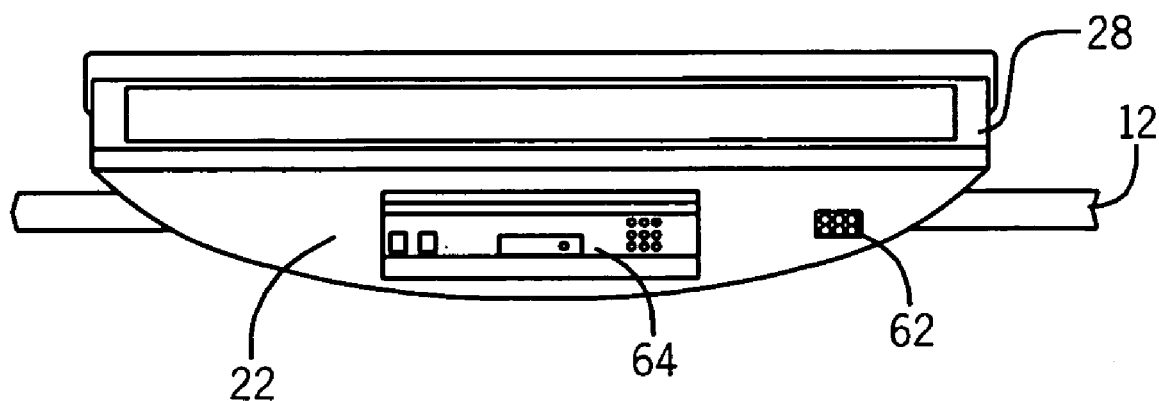
FIG. 22 is a bottom view of a ceiling mounting system constructed in accordance with various embodiments of the present invention having the quick access cover of FIG. 21 removed.

Many flat panel displays reserve one side of the display or one surface for maintenance, configuration, output controls, ports, and devices 64. FIGS. 21 and 22 show a quick access cover 60 to hide, yet provide convenient access to the controls, ports, and devices 64. Also, an IR receiver screen 62 is integrated into the back cover 22 to allow signals to be transmitted to the IR receiver 42 described above. While FIGS. 21 and 22 show that the quick access cover 60 and the IR receiver screen 62 are integrated into a bottom portion of the back cover 22, they can be configured on any surface of the back cover 22 to match the various manufacturer locations of the controls, ports, and devices 64 on the flat panel display 28. It should further be noted that as shown in FIGS. 1-22, a relatively low amount of hardware is utilized when installing the ceiling mounting system 5 to a ceiling, and when mounting a flat panel display 28 and any related media components to the ceiling mounting system 5. This aids in the ease and convenience of installation and adjustment of the ceiling mounting system 5.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A mounting system, comprising:
    an adapter plate configured to attach to a rear surface of a first media device;
    a first tube pivotally attached at a first end, to a top surface of the adapter plate, wherein the first tube is configured to allow passage of at least one cable through its length from the first end to a second end distal from the first end;
    a moveable decoupler securedly attached to the second end of the first tube, wherein the decoupler is configured to be mounted to a support structure; and
    a return to zero mechanism comprising a centering channel and a centering bolt integrated into the moveable decoupler, wherein the return to zero mechanism is configured to withstand an impact to the mounting system and return the mounting system to a default position upon release of the impact.

2. The system of claim 1, wherein the adapter plate comprises a plurality of keyholes arranged to match mounting screws located on the rear surface of the first media device, the mounting screws attaching the adapter plate to the first media device.

3. The system of claim 1, wherein the first media device comprises a flat panel display.

4. The system of claim 1, wherein the adapter plate is configured to secure at least one second media device.

5. The system of claim 4, wherein the second media device comprises at least one of a set top box, a computer processor, and a media content receiver.

6. The system of claim 4, wherein the at least one second media device is secured to the adapter plate via a hinged bracket.

7. The system of claim 1, wherein the adapter plate is configured to secure at least one infrared receiver device.

8. The system of claim 7, wherein the at least one infrared receiver device is protected by an infrared receiver screen configured to allow infrared signals to be transmitted to the at least one infrared receiver device, and the infrared receiver screen is integrated into a back cover that engages the adapter plate.

9. The system of claim 1, wherein a back cover is configured to engage the adapter plate, substantially completely enclosing at least the rear surface of the first media device and the adapter plate.

10. The system of claim 1, wherein a useable length of the first inner tube is extended by a second inner tube.

11. The system of claim 10, wherein the second end of the first inner tube is inserted into a first end of the second inner tube, the second inner tube being secured at predetermined intervals along the length of the first inner tube.

12. The system of claim 10, wherein the second inner tube has integrated therein a cable opening at a second end distal from the first end, through which the at least one cable routed through the first inner tube can exit and enter.

13. The system of claim 1, wherein the support structure comprises a cross rod.

14. The system of claim 13, wherein each end of the cross rod is secured to a ceiling truss by a side bracket.

15. The system of claim 1, wherein the moveable decoupler includes a cylindrical bottom portion, and wherein the second end of the first tube is securely attached to the cylindrical bottom portion of the decoupler.

16. The system of claim 15, wherein upon an impact inducing substantially rotational movement about an axis defined along the length of the centering bolt, the movable, cylindrical bottom portion of the decoupler moves in a like motion, allowing the centering bolt to travel within the centering channel.

17. The system of claim 15, wherein the centering channel is shaped so that a center portion of the centering channel is lower than either end portion of the centering channel.

18. The system of claim 17, wherein on the impact is released, the movable, cylindrical bottom portion of the decoupler returns to the default position.

19. The system of claim 17, wherein the default position comprises a position wherein the centering bolt is resting at the lower center portion of the centering channel.

20. A mounting system, comprising:
   an adapter plate configured to attach to a rear surface of a media device;
   a back cover configured to engage the adapter plate, the back cover configured to hide the rear surface of the media device from view when engaged with the adapter plate;
   a tube pivotally attached at a first end, to a top surface of the adapter plate, wherein the tube is configured to allow passage of at least one cable through its length from the first end to a second end distal from the first end; and
   a decoupler securely attached to the second end of the tube, the decoupler including a centering channel and a centering bolt moveably associated with the centering channel, wherein the decoupler is configured to be mounted to a support structure, and wherein the centering bolt is configured to travel within the centering channel from a default position in response to movement of the mounting system.

21. The system of claim 20, wherein the back cover slidably engages the adapter plate.

* * * * *

UNITED STATES PATENT AND TRADEMARK OFFICE
CERTIFICATE OF CORRECTION

| | | |
|---|---|---|
| PATENT NO. | : 7,883,067 B2 | Page 1 of 1 |
| APPLICATION NO. | : 11/981899 | |
| DATED | : February 8, 2011 | |
| INVENTOR(S) | : James Duane Walters and Matthew William Stifal | |

It is certified that error appears in the above-identified patent and that said Letters Patent is hereby corrected as shown below:

IN THE CLAIMS:

Column 9, Claim 18, Line 24, "on" should be -- once --.

Signed and Sealed this
Twelfth Day of April, 2011

David J. Kappos
*Director of the United States Patent and Trademark Office*